United States Patent
Costa et al.

(10) Patent No.: US 12,151,142 B2
(45) Date of Patent: Nov. 26, 2024

(54) GOLF BALL ALIGNMENT AID AND METHOD OF FORMING SAME

(71) Applicant: Acushnet Company, Fairhaven, MA (US)

(72) Inventors: Edward Costa, East Providence, RI (US); Dennis Britton, North Dartmouth, MA (US); Nelson Araujo, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/170,251

(22) Filed: Feb. 16, 2023

(65) Prior Publication Data

US 2024/0278082 A1    Aug. 22, 2024

(51) Int. Cl.
  *A63B 37/02*  (2006.01)
  *A63B 37/00*  (2006.01)
  *B29D 99/00*  (2010.01)

(52) U.S. Cl.
  CPC .. *A63B 37/00691* (2020.08); *A63B 37/00376* (2020.08); *A63B 37/0061* (2013.01); *A63B 37/0074* (2013.01); *B29D 99/0042* (2013.01)

(58) Field of Classification Search
  CPC ........ A63B 37/00691; A63B 37/00376; A63B 37/0061; A63B 37/0074; A63B 45/00; A63B 45/02; B29D 99/0042; B29L 2031/546
  See application file for complete search history.

(56) References Cited

U.S. PATENT DOCUMENTS

| | | | |
|---|---|---|---|
| 4,664,387 A * | 5/1987 | Tardiff | A63B 69/3688 473/200 |
| 6,172,161 B1 * | 1/2001 | Bissonnette | C08F 285/00 525/193 |
| 6,180,040 B1 * | 1/2001 | Ladd | B29C 63/22 264/250 |
| 6,797,097 B2 | 9/2004 | Boehm et al. | |
| 7,033,532 B2 * | 4/2006 | Bissonnette | C08F 285/00 264/250 |
| 7,335,326 B2 | 2/2008 | Brum | |
| 7,361,102 B2 | 4/2008 | Ladd et al. | |
| 7,407,378 B2 | 8/2008 | Brum | |
| 9,227,109 B2 | 1/2016 | Michalewich et al. | |
| 9,737,766 B2 | 8/2017 | Sullivan et al. | |
| 9,795,836 B2 | 10/2017 | Comeau et al. | |
| 11,484,762 B1 * | 11/2022 | Rivera | A63B 43/04 |
| 2003/0069088 A1 * | 4/2003 | Brum | A63B 45/00 473/378 |
| 2005/0026725 A1 * | 2/2005 | Nesbitt | A63B 37/0097 473/371 |

(Continued)

*Primary Examiner* — John E Simms, Jr.
(74) *Attorney, Agent, or Firm* — Thomas P. Gushue

(57) ABSTRACT

A golf ball and a method of forming a golf ball is disclosed herein. The golf ball includes an alignment aid or feature that is integrally formed with a core body of the golf ball. A cover is provided that allows the alignment aid to be visible from an exterior of the golf ball. The alignment aid can be formed as central spherical segment that fuses two spherical cap portions with each other to form the core body. Different material selections can be made for the spherical cap portions and the central spherical segment that can further provide variation in performance characteristics of the golf ball.

11 Claims, 7 Drawing Sheets

(56) References Cited

U.S. PATENT DOCUMENTS

| | | | |
|---|---|---|---|
| 2013/0165261 A1* | 6/2013 | Luciano, Jr. | A63B 43/004 |
| | | | 473/371 |
| 2014/0066229 A1* | 3/2014 | Kuntimaddi | A63B 37/0022 |
| | | | 473/378 |
| 2016/0114222 A1* | 4/2016 | Scolamiero | B33Y 80/00 |
| | | | 264/255 |
| 2021/0379451 A1* | 12/2021 | Westgate | B29D 99/0042 |
| 2022/0047923 A1* | 2/2022 | Durham | A63B 37/00373 |
| 2022/0062711 A1 | 3/2022 | Costa et al. | |
| 2022/0143470 A1 | 5/2022 | Kuntimaddi | |

* cited by examiner

GOLF BALL ALIGNMENT AID AND METHOD OF FORMING SAME

FIELD OF THE INVENTION

This disclosure generally relates to a golf ball, and more particularly relates to an alignment aid for a golf ball.

BACKGROUND OF THE INVENTION

Alignment features on golf balls are well known. One type of alignment feature requires an alignment indicator to be printed onto an outer surface or layer of a golf ball. Printing alignment indicators or aids onto balls can be time consuming and requires specifically locating a great circle or equator of the golf ball.

It would be desirable to provide an alignment feature or aid that does not require an additional printing step.

SUMMARY OF THE INVENTION

In some embodiments, the present disclosure provides an alignment aid on a golf ball. The alignment aid can be formed integrally with a core or other internal portion of the golf ball, such that printing or painting on an exterior surface of the golf ball (i.e., the cover) is not required. This provides an improved method and configuration for providing an alignment aid on a golf ball by avoiding issues with printing or painting, which generally require additional time and resources during manufacturing.

In one aspect, a method of forming a golf ball with an alignment aid is provided. The method comprises forming a core comprising a first spherical cap portion, a second spherical cap portion, and a central spherical segment formed at a great circle of the core and arranged between the first spherical cap portion and the second spherical cap portion. The central spherical segment can have a first color characteristic, and at least one of the first spherical cap portion or the second spherical cap portion can have a second color characteristic that is different than the first color characteristic. The method can further comprise encasing the core in a cover to form the golf ball. The cover can be at least partially transparent, and the central spherical segment is visible from an exterior of the golf ball such that the central spherical segment defines an alignment aid.

The first spherical cap portion and the second spherical cap portion can each have the second color characteristic, in one aspect.

The first color characteristic of the central spherical segment can define a continuous strip across a great circle of the golf ball.

The first spherical cap portion and the second spherical cap portion can be formed from a first material, first material composition, or first rubber composition, and the central spherical segment can be formed from a second material, second material composition, or second rubber composition that is different than the first material, first material composition, or first rubber composition. One of ordinary skill in the art would understand that the materials used to form the spherical cap portions can have different hardness or coefficient of restitution (COR) values than the central spherical segment. In one aspect, both the first spherical cap portion and the second spherical cap portion are formed from a first rubber composition that is polybutadiene based, and the central spherical segment is formed from a second rubber composition that is also polybutadiene based but different than the first rubber composition. In one aspect, the materials or compositions used to form the central spherical segment and the first spherical cap portion and the second spherical cap portion can be similar, but secondary components or elements, such as fillers, co-agents, radical scavengers, and/or additives can vary between the two rubber compositions. In one aspect, the formation steps or processes can vary between forming or curing the relative components. For example, the amount of pressure, temperature, cycle length, or other variables can be modified between the steps used for forming the central spherical segment, the first spherical cap portion, and/or the second spherical cap portion. Accordingly, the resulting properties of the central spherical segment, the first spherical cap portion, and the second spherical cap portion can vary.

The central spherical segment can have a thickness of 2.0 mm-4.0 mm, in one aspect. The thickness of the central spherical segment can vary depending on the specific requirements of a particular golf ball. The central spherical segment can define a barrier, boundary, or border between the first spherical cap portion and the second spherical cap portion. The central spherical segment can provide a physical demarcation on the golf ball or golf ball core between the first spherical cap portion and the second spherical cap portion.

The core of the golf ball can be formed according to a variety of ways. For example, forming the core can comprise initially forming a unitary spherical body, cutting the unitary spherical body at a great circle to form the first spherical cap portion and the second spherical cap portion, disposing the central spherical segment in a pre-cured or uncured state between the first spherical cap portion and the second spherical cap portion, and curing the central spherical segment to fuse the first spherical cap portion with the second spherical cap portion and form the core.

In another example, forming the core can comprise forming the first spherical cap portion and the second spherical cap portion separately from each other, disposing or positioning the central spherical segment in a pre-cured or uncured state between the first spherical cap portion and the second spherical cap portion, and curing the central spherical segment to fuse the first spherical cap portion with the second spherical cap portion and form the core.

In yet another example, forming the core can comprise forming the first spherical cap portion and the second spherical cap portion separately from each other and in a pre-cured state or uncured state, disposing the central spherical segment in a pre-cured or uncured state between the first spherical cap portion and the second spherical cap portion, and curing the first spherical cap portion, the second spherical cap portion, and the central spherical segment simultaneously such that the central spherical segment fuses the first spherical cap portion with the second spherical cap portion to form the core.

In yet another example, forming the core can comprise forming the first spherical cap portion and the second spherical cap portion separately from each other, such that the first spherical cap portion defines a first pocket and the second spherical cap portion defines a second pocket. The method of forming the core can further comprise disposing an inner core in a pre-cured or uncured state between the first spherical cap portion and the second spherical cap portion. The inner core can comprise a first inner core portion having a cylindrical or spherical profile and a second inner core portion that surrounds a periphery of the first inner core portion. The method of forming the core can further comprise curing the inner core to fuse the first spherical cap portion with the second spherical cap portion and form the core, such that the central spherical segment is at least partially defined by the first inner core portion and the second inner core portion.

Various methods of forming the core are disclosed herein in which the spherical cap portions can originate from a common spherical core body, or in which the spherical cap portions are fully formed separately from each other. The central spherical segment can generally act as a bonding segment or fusing segment configured to be arranged between the spherical cap portions to complete the formation of the core body. The central spherical segment can be a different color than the spherical cap portions, and therefore the central spherical segment can serve multiple functions of defining an alignment aid as well as bonding or fusing the two spherical cap portions with each other.

In another aspect, a golf ball is disclosed with an integrally formed alignment aid. The golf ball comprises a core including a first spherical cap portion, a second spherical cap portion, and a central spherical segment arranged between the first spherical cap portion and the second spherical cap portion. The central spherical segment can have a first color characteristic, and at least one of the first spherical cap portion or the second spherical cap portion can have a second color characteristic that is different than the first color characteristic. A cover is provided that encases the core, and the cover is transparent or semi-transparent such that the orientation of the central spherical segment is visible from an exterior of the golf ball. One of ordinary skill in the art would understand that other intermediate layers could be incorporated into the golf ball construction.

Another method of forming a golf ball with an alignment aid is also disclosed. The method includes forming a core comprising a first spherical cap portion, a second spherical cap portion, and a central spherical segment formed at a great circle of the core and arranged between the first spherical cap portion and the second spherical cap portion. The central spherical segment is a first color, and the first spherical cap portion and the second spherical cap portion each are a second color that is different than the first color. In another aspect, the first spherical cap portion is a second color that is different than the first color, and the second spherical cap portion is a third color that is different than the first color and the second color. The central spherical segment has a thickness of 2.0 mm-4.0 mm and defines a continuous strip across a great circle of the golf ball. The method can comprise encasing the core in a cover to form the golf ball. The cover can be clear such that the orientation of the central spherical segment is visible from an exterior of the golf ball.

Various other aspects, examples, and embodiments are provided herein.

BRIEF DESCRIPTION OF THE DRAWINGS

Further features and advantages of the present disclosure can be ascertained from the following detailed description that is provided in connection with the drawings described below.

DETAILED DESCRIPTION OF THE INVENTION

Figure 1A:
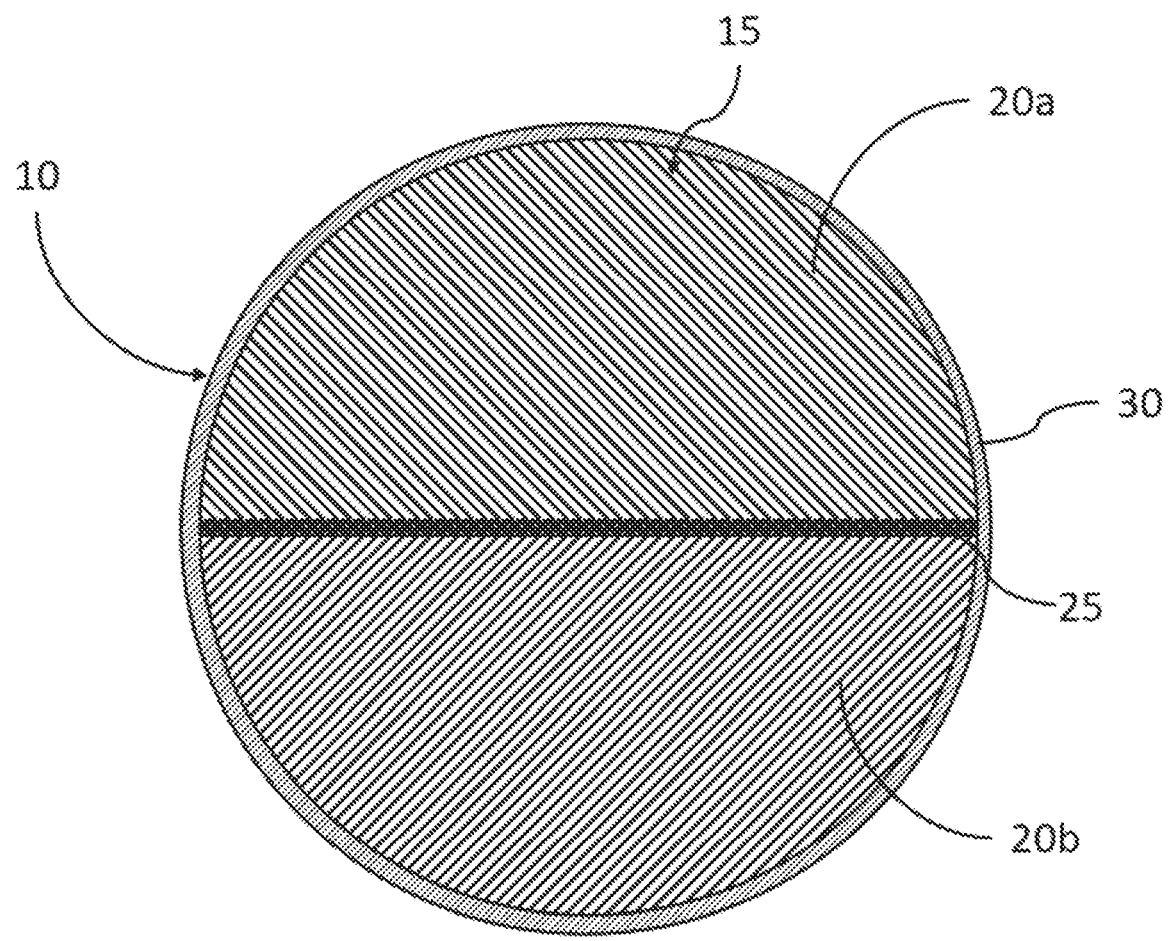
FIG. 1A is an illustration of a golf ball including an alignment aid according to one aspect.

According to the disclosed embodiments, a method of forming a golf ball with an alignment aid, and a golf ball including an alignment aid is disclosed herein. The alignment aid generally defines a spherical arc around the finished golf ball. In one aspect, the alignment aid can be defined by a spherical segment that is integrated within the core of the golf ball. The alignment aid can be defined as a spherical slice of the golf ball, and can extend uninterrupted through an entire spherical segment of the golf ball. The alignment aid can be defined along a great circle of the golf ball. The alignment aid can be defined along an equator of the golf ball.

The method of forming the golf ball 10 can comprise forming a core 15 comprising a first spherical cap portion 20a, a second spherical cap portion 20b, and a central spherical segment 25 formed at a great circle of the core 15 and arranged between the first spherical cap portion 20a and the second spherical cap portion 20b. In one aspect, the central spherical segment 25 is defined at an equator of the golf ball 10. The central spherical segment 25 can serve multiple purposes, including but not limited to, defining the alignment aid, and also providing a bonding or fusing segment or feature between the spherical cap portions 20a, 20b.

The central spherical segment 25 can have a first color characteristic, and at least one of the first spherical cap portion 20a or the second spherical cap portion 20b can have a second color characteristic that is different than the first color characteristic. In one aspect, each of the spherical cap portions 20a, 20b and the central spherical segment 25 can be different colors from each other.

As used in this disclosure, the term color characteristic can mean shading or tone of color. One ordinary skill in the art would understand that the color characteristic can refer to any one or more of hue, pattern, tint, shade, tone, saturation, intensity, or other property. Based on this configuration, the central spherical segment 25 can define a band, strip, or line that extends 360 degrees around a great circle of the golf ball 10. The central spherical segment 25 can have a characteristic such that the central spherical segment 25 contrasts with at least one of the first spherical cap portion 20a or the second spherical cap portion 20b. The color characteristics can be sufficiently distinct or different from each other such that one of ordinary vision can readily detect the differences in the color characteristics. The colors of the central spherical segment 25 and the first spherical cap portion 20a or the second spherical cap portion 20b can be selected such that a high contrast between these two features on the golf ball is visible to a golfer having average vision at least up to ten feet from the golf ball. This allows a golfer to align the central spherical segment 25 perpendicular to a club face to aid with alignment of the golf ball 10 relative to the club face.

The method can further comprise encasing the core 15 in a cover 30 to form the golf ball 10. The cover 30 can be at least partially transparent such that the orientation of the central spherical segment 25 is visible from an exterior of the golf ball 10. Formation of the cover 30 on the core 15 of the golf ball can also be achieved according to a variety of techniques and methods. The cover 30 can be formed from known transparent cover materials, such as cast urethane, ionomer, or thermoplastic materials, such as Surlyn® from DuPont. The cover 30 can be formed such that it lacks any color concentrate, dyes, or other coloring agents. In one example, the cover 30 can be formed as a transparent layer and further sprayed with a clear paint. Additional clear protective coatings or layers can be applied to the cover 30. At least one ball marker or marking (i.e., logo, ball type, player number, etc.) can be applied to the cover 30.

The cover 30 can be formed from a variety of materials, for example, polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer; cross-linked trans-polyisoprene and blends thereof; polyester-based thermoplastic elastomers; polyurethane-based thermoplastic elastomers; synthetic or natural vulcanized rubber; and combinations thereof.

In one embodiment, the cover 30 can be formed from a polyurethane, polyurea, or hybrid of polyurethane-polyurea. The cover 30 can be formed by conventional casting, reaction injection molding techniques, conventional compression, or injection molding techniques, as one of ordinary skill in the art would appreciate.

In one configuration, at least one additional casing layer can be provided between the core body 15 and the cover 30, and the at least one additional casing layer can also be formed from a material that is at least partially transparent such that the orientation of the central spherical segment 25 is visible from an exterior of the golf ball 10. One of ordinary skill in the art would understand that a plurality of core layers can be used and incorporate the alignment aid feature disclosed herein. A solid core body can be used, or a multi-layer core body can be used.

The first spherical cap portion 20a and the second spherical cap portion 20b can each have the second color characteristic, in one aspect. In one configuration, the first spherical cap portion 20a and the second spherical cap portion 20b can each be white, and the central spherical segment 25 can be black. Other high contrasting colors can be used for the colors of the spherical cap portions 20a, 20b versus the central spherical segment 25. The first color characteristic of the central spherical segment 25 can define a continuous strip across a great circle of the golf ball. The color characteristics of the first spherical cap portion 20a, the second spherical cap portion 20b, and the central spherical segment 25 can vary. In one configuration, the central spherical segment 25 can be black, and the first spherical cap portion 20a and the second spherical cap portion 20b can be yellow or orange. In one configuration, the central spherical segment 25 can be red, and the first spherical cap portion 20a and the second spherical cap portion 20b can be white. In one example, the first spherical cap portion 20a and the second spherical cap portion 20b can be purple, and the central spherical segment 25 can be yellow. Other exemplary colors of either the central spherical segment 25 or the first spherical cap portion 20a and the second spherical cap portion 20b can be red, yellow, orange, green, pink, blue, purple, etc.

In one configuration, the first spherical cap portion 20a can have a first color characteristic, the second spherical cap portion 20b can have a second color characteristic, and the central spherical segment 25 can have a third color characteristic. Three distinct colors can be used for the first spherical cap portion 20a, the second spherical cap portion 20b, and the central spherical segment 25.

In addition to the color characteristics being different and varying, the first spherical cap portion 20a and the second spherical cap portion 20b can be formed from a first material, and the central spherical segment 25 can be formed from a second material that is different than the first material. Some exemplary materials for forming the first spherical cap portion 20a and the second spherical cap portion 20b, and some exemplary materials for forming the central spherical segment 25 can include rubber compositions, such as polybutadiene, ethylene-propylene rubber, ethylene-propylene-diene rubber, polyisoprene, styrene-butadiene rubber, polyalkenamers, butyl rubber, halobutyl rubber, or polystyrene elastomers. Thermoset rubber compositions containing polybutadiene rubber may be used to form both the spherical cap portions and the central spherical segment. In another version, at least one of the spherical cap portions or the central spherical segment is formed from a thermoplastic composition. For example, ionomer compositions comprising an ethylene acid copolymer containing acid groups such that less than 70% of the acid groups are neutralized (partially neutralized polymers) may be used. In another example, ionomer compositions comprising an ethylene acid copolymer containing acid groups such that greater than 70% of the acid groups are neutralized (highly neutralized polymers or HNPs) may be used. For example, thermoplastic ionomer compositions may be used to form both the spherical cap portions and the central spherical segment. In another example, a thermoset rubber composition may be used to form one of the spherical cap portions or the central spherical segment, and a thermoplastic ionomer composition may be used to form the other one of the spherical cap portions and the central spherical segment. In yet another example, a thermoplastic ionomer composition may be used to form one of the spherical cap portions or the central spherical segment and a thermoset rubber composition may be used to form the other one of the spherical cap portions and the central spherical segment. Other exemplary compositions are disclosed in US Patent Application Pub. 2022/0143470 A1, which is commonly assigned to Acushnet Company and is incorporated in its entirety by reference as if fully set forth herein.

In one aspect, the first spherical cap portion 20a, the second spherical cap portion 20b, and the central spherical segment 25 are formed from the same material. The first spherical cap portion 20a, the second spherical cap portion 20b, and the central spherical segment 25 can then undergo identical formation processes, such as curing, to ensure that the core 15 has uniform or similar performance characteristic. In another aspect, the central spherical segment 25 can be formed from rubber having different characteristics than the rubber used to form the first spherical cap portion 20a and the second spherical cap portion 20b. In one example, the rubber formulation themselves can be different. In another example, additives may differ between the rubber compositions used for the first spherical cap portion 20a/the second spherical cap portion 20b and the central spherical segment 25. In yet another example, different molding techniques can be used to provide different performance characteristics between the two rubber compositions. One of ordinary skill in the art would understand that the rubber compositions can have varying secondary elements or components, such as fillers, hardening agents, co-agents, radical scavengers, additives, etc. One of ordinary skill in the art would understand that various secondary elements can be added to the rubber composition in order to promote cross-linking, add weight, remove/de-active impurities, etc. Differing levels of these secondary additives or components can be altered in at least one of the rubber compositions for the first spherical cap portion 20a, the second spherical cap portion 20b, and/or the central spherical segment 25. Further, different temperatures, pressures, or other formation variables can be altered during cross-linking, curing, or other processing of the rubber compositions for the first spherical cap portion 20a, the second spherical cap portion 20b, and/or the central spherical segment 25. One of ordinary skill in the art would understand that these modifications, which can either be chemical/compositionally based or process based, can alter the resulting characteristics of the rubber compositions for the first spherical cap portion 20a, the second spherical cap portion 20b, and/or the central spherical segment 25. Alternatively, all compositions and processes can be identical such that the characteristics of the first spherical cap portion 20a, the second spherical cap portion 20b, and the central spherical segment 25 are identical.

Based on the difference in the characteristics of the first spherical cap portion 20a and the second spherical cap portion 20b, and the central spherical segment 25, various performance characteristics of the golf ball can vary. For example, a different hardness gradient can be defined across the core of the golf ball depending on the orientation of the golf ball relative to the direction of impact from a golf club. In one example, the alignment aid of the central spherical segment 25 can provide at least two orientation based signals or queues to a user. For example, aligning the golf ball 10 in a first orientation relative to the ground surface or a tee could provide a higher hardness gradient which generally decreases spin of the golf ball, while alignment in a second orientation relative to the ground surface or a tee that is different and/or opposite from the first orientation can provide a lower hardness gradient which provides higher spin. The different orientations can be used by a golfer depending on the desired spin for a particular shot.

In one configuration, the central spherical segment 25 can be formed with a gasket-like profile. The mass or weight of the core can be shifted from known golf ball core designs such that the golf ball's moment of inertia is increased by shifting weight to an outer region of the core. This configuration can provide lower spin on longer shots, such as drives, while also providing increased roll to improve distance.

In one configuration, the central spherical segment 25 can be formed from a material or a process that results in a higher coefficient of restitution (COR) than the material or process used to form the first and second spherical cap portions 20a, 20b. In one aspect, the materials used to form the central spherical segment 25 and the first and second spherical cap portions 20a, 20b can be relatively similar, except an amount of fillers, co-agents, radical scavengers, and/or other additives can vary between the two formulations used to form the central spherical segment 25 and the first and second spherical cap portions 20a, 20b. Accordingly, the subsequent curing and cross-linking can result in different properties for the central spherical segment 25 and the first and second spherical cap portions 20a, 20b. In another aspect, the curing process can be altered to result in a different COR.

In one embodiment, the rubber core includes a geometric center having a hardness $H_C$, a geometric surface having a hardness $H_S$, and a hardness gradient $H_{Gr}$ equal to the difference in the geometric center hardness and the surface hardness, wherein the hardness gradient is between 25 Shore C-55 Shore C. In another aspect, the hardness gradient can be 1 Shore C-15 Shore C. In one example, the first and second spherical cap portions 20a, 20b can have physical properties such that if the same materials and processes were used to mold a typical golf ball core body (i.e., a roughly 1.510"-1.550" diameter solid sphere that lacks the central spherical segment 25), then the resulting golf ball core body could have a COR that is about +/-15% of a COR in a golf ball core that includes the central spherical segment 25. Stated differently, the COR of a golf ball core formed according to the present disclosure can result in a COR that is greater (about +15%) or less (about -15%) than a COR that would be expected in a similarly formulated golf ball core that lacks the central spherical segment 25.

In one example, the first spherical cap portion 20a and the second spherical cap portion 20b have a first hardness value and the central spherical segment 25 has a second hardness value. The first hardness value can be greater than the second hardness value, in one example. In another example, the first hardness value can be less than the second hardness value. In yet another example, the first and second hardness values can be the same.

In one example, the first spherical cap portion 20a and the second spherical cap portion 20b have a first COR value and the central spherical segment 25 has a second COR value. The first COR value can be greater than the second COR value, in one example. In another example, the first COR value can be less than the second COR value. In yet another example, the first and second COR values can be the same.

In one example, the first spherical cap portion 20a and the second spherical cap portion 20b have a first specific gravity value and the central spherical segment 25 has a second specific gravity value. The first specific gravity value can be greater than the second specific gravity value, in one example. In another example, the first specific gravity value can be less than the second specific gravity value. In yet another example, the first and second specific gravity values can be the same. In one aspect, the central spherical segment 25 can be formed from a material having a higher specific gravity than the first spherical cap portion 20a and the second spherical cap portion 20b, which can increase spin of the golf ball. In one aspect, the spin of the golf ball can be increased by lining up the alignment aid defined by the central spherical segment 25 as an equator on the golf ball prior to impact with a golf club. In another aspect, when the central spherical segment 25 is formed from a material having a lower specific gravity than the first spherical cap portion 20a and the second spherical cap portion 20b, then spin can be reduced or decreased when the central spherical segment 25 is aligned as an equator of the golf ball prior to impact with a golf club.

The profile of the central spherical segment 25 can vary, as one of ordinary skill in the art would appreciate based on this disclosure. In one example, the central spherical segment 25 is formed as a washer. Based on this profile, the central spherical segment 25 can increase the weight around the equator formed by the central spherical segment 25.

Exemplary materials for forming the spherical cap portions 20a, 20b and the central spherical segment 25 can include various blends of rubber, such as polybutadiene. Exemplary formulations for compositions of the spherical cap portions 20a, 20b and the central spherical segment 25 are disclosed in U.S. Pat. Nos. 9,737,766, 9,795,836, and 9,227,109, which are commonly assigned to Acushnet Company, and are incorporated in their entirety as if fully set forth herein.

Additional exemplary materials for forming the first spherical cap portion 20a and the second spherical cap portion 20b, as well as the central spherical segment 25 are disclosed herein. For example, the core rubber formulations (i.e., the first spherical cap portion 20a, the second spherical cap portion 20b, and/or the central spherical segment 25) of the present disclosure include a base rubber. The rubber formulations for forming the core can include additional components, such as a hardening agent, cross-linking agent, reactive cross-linking co-agent, free radical initiator, and/or fillers. Antioxidants, processing aids, accelerators, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art, may also be added to the rubber formulation.

The present disclosure describes golf balls having a core formed from multiple components or elements, wherein each component is made from core rubber formulations. The first spherical cap portion 20a and the second spherical cap portion 20b may be made from a first composition and the central spherical segment 25 may be made from a second, different composition. Each of the first and second compositions may be made from a core rubber formulation. The following description of rubber compositions and formulations can be applicable to the first spherical cap portion 20a, the second spherical cap portion 20b, and/or the central spherical segment 25.

In some embodiments, the core rubber formulations include a base rubber, a hardening agent, a cross-linking agent, and a free radical initiator. It should be understood, however, that not all core rubber formulations that may be used in a core component or element necessarily requires all of these elements. Further, rubber formulations may also optionally include additives, such as one or more of a metal oxide, metal fatty acid or fatty acid, antioxidant, soft and fast agent, or fillers. Concentrations of components are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The core rubber formulations of the present disclosure can include a base rubber. In some embodiments, the base rubber may include natural and synthetic rubbers and combinations of two or more thereof. Examples of natural and synthetic rubbers suitable for use as the base rubber include, but are not limited to, polybutadiene, polyisoprene, ethylene propylene rubber (EPR), ethylene-propylene-diene (EPDM) rubber, grafted EPDM rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

For example, the core may be formed from a rubber formulation that includes polybutadiene as the base rubber. Polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. In one embodiment, a transition metal complex (for example, neodymium, nickel, or cobalt) or an alkyl metal such as alkyl lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. For example, the polybutadiene rubber may have a 1,4 cis-bond content of at least 40 percent. In another embodiment, the polybutadiene rubber has a 1,4 cis-bond content of greater than 80 percent. In still another embodiment, the polybutadiene rubber has a 1,4 cis-bond content of greater than 90 percent. In general, polybutadiene rubbers having a high 1,4 cis-bond content have high tensile strength and rebound.

Examples of commercially available polybutadiene rubbers that can be used in rubber formulations in accordance with the present disclosure, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

In another embodiment, the core 15 is formed from a rubber formulation including butyl rubber. Butyl rubber is an elastomeric copolymer of isobutylene and isoprene. Butyl rubber is an amorphous, non-polar polymer with good oxidative and thermal stability, good permanent flexibility, and high moisture and gas resistance. Generally, butyl rubber includes copolymers of about 70 percent to about 99.5 percent by weight of an isoolefin, which has about 4 to 7 carbon atoms, for example, isobutylene, and about 0.5 percent to about 30 percent by weight of a conjugated multiolefin, which has about 4 to 14 carbon atoms, for example, isoprene. The resulting copolymer contains about 85 percent to about 99.8 percent by weight of combined isoolefin and about 0.2 percent to about 15 percent of combined multiolefin. A commercially available butyl rubber suitable for use in rubber formulations in accordance with the present disclosure includes Bayer Butyl 301 manufactured by Bayer AG.

The rubber formulations may include a combination of two or more of the above-described rubbers as the base rubber. In some embodiments, the rubber formulation of the present disclosure includes a blend of different polybutadiene rubbers. In this embodiment, the rubber formulation may include a blend of a first polybutadiene rubber and a second polybutadiene rubber in a ratio of about 5:95 to about 95:5. For example, the rubber formulation may include a first polybutadiene rubber and a second polybutadiene rubber in a ratio of about 10:90 to about 90:10 or about 15:85 to about 85:15 or about 20:80 to about 80:20 or about 30:70 to about 70:30 or about 40:60 to about 60:40. In other embodiments, the rubber formulation may include a blend of more than two polybutadiene rubbers or a blend of polybutadiene rubber(s) with any of the other elastomers discussed above.

In other embodiments, the rubber formulation used to form the core 15 includes a blend of polybutadiene and butyl rubber. In this embodiment, the rubber formulation may include a blend of polybutadiene and butyl rubber in a ratio of about 10:90 to about 90:10. For example, the rubber formulation may include a blend of polybutadiene and butyl rubber in a ratio of about 10:90 to about 90:10 or about 20:80 to about 80:20 or about 30:70 to about 70:30 or about 40:60 to about 60:40. In other embodiments, the rubber formulation may include polybutadiene and/or butyl rubber in a blend with any of the other elastomers discussed above.

In further embodiments, the rubber formulation used to form the core 15 includes a blend of polybutadiene and EPDM rubber or grafted EPDM rubber as the base rubber. In still further embodiments, the rubber formulations may include a combination of polybutadiene rubber and EPDM rubber as the base rubber. In this embodiment, the EPDM may be included in the rubber formulation in an amount of about 0.1 to about 20 or about 1 to about 15 or about 3 to about 10 parts by weight per 100 parts of the total rubber. For example, EPDM may be included in the rubber formulation in an amount of about 5 parts by weight per 100 parts of the total rubber. In still further embodiments, the core formulations may combine EPDM rubber and two or more different types of polybutadiene rubber, such as two or more different types of high cis-1,4 polybutadiene, as the base rubber.

The rubber formulations include the base rubber in an amount of 100 phr. That is, when more than one rubber component is used in the rubber formulation as the base rubber, the sum of the amounts of each rubber component should total 100 phr. In some embodiments, the rubber formulations include polybutadiene rubber as the base rubber in an amount of 100 phr. In other embodiments, the rubber formulations include polybutadiene rubber and a second rubber component. In this embodiment, the polybutadiene rubber may be used in an amount of about 80 to about 99.9 parts by weight per 100 parts of the total rubber and the second rubber component may be used in an amount of about 0.1 to about 20 parts by weight per 100 parts of the total rubber. In further embodiments, the polybutadiene rubber may be used in an amount of about 85 to about 99 parts by weight per 100 parts of the total rubber and the second rubber component may be used in an amount of about 1 to about 15 parts by weight per 100 parts of the total rubber. In yet other embodiments, the polybutadiene rubber may be used in an amount of about 90 to about 97 parts by weight per 100 parts of the total rubber and the second rubber component may be used in an amount of about 3 to about 10 parts by weight per 100 parts of the total rubber. In still further embodiments, the polybutadiene rubber may be used in an amount of about 94 to about 96 parts by weight per 100 parts of the total rubber and the second rubber component may be used in an amount of about 4 to about 6 parts by weight per 100 parts of the total rubber. In some embodiments, the second rubber component is EPDM rubber.

The base rubber may be used in the rubber formulation in an amount of at least about 5 percent by weight based on total weight of the rubber formulation. In some embodiments, the base rubber is included in the rubber formulation in an amount within a range having a lower limit of about 10 percent or 20 percent or 30 percent or 40 percent or 50 percent or 55 percent and an upper limit of about 60 percent or 70 percent or 80 percent or 90 percent or 95 percent or 100 percent. For example, the base rubber may be present in the rubber formulation in an amount of about 30 percent to about 80 percent by weight based on the total weight of the rubber formulation. In another example, the rubber formulation includes about 40 percent to about 70 percent base rubber based on the total weight of the rubber formulation.

The rubber formulations of the present disclosure can include a hardening agent. Without being bound to any particular theory, the hardening agent may affect the hardness of the core and the hardness gradient across the core. Suitable hardening agents include, but are not limited to, benzoic compounds comprising a nitro functional group and one of a hydroxyl, amino, or sulfhydryl functional group. Nonlimiting examples of hardening agents include nitrophenol, nitroaniline, and nitrothiophenol. Different isomers of the hardening agent may be used such as, for example, 2-nitrophenol, 3-nitrophenol, 4-nitrophenol, 2-nitroaniline, 3-nitroaniline, 4-nitroaniline, 2-nitrothiophenol, 3-nitrothiophenol, 4-nitrothiophenol, and combinations thereof. Without being bound by any particular theory, different isomers of the hardening agent may affect the hardness of the core differently and produce different hardness gradients across the core. Some hardening agents, for example nitrophenol, may be advantageous because they are safe and/or easy to handle during manufacturing.

The hardening agent may be included in the rubber formulation in varying amounts depending on the desired characteristics of the golf ball core. For example, the hardening agent may be used in an amount of 0.01 to about 3 parts by weight per 100 parts of the total rubber. In one embodiment, the rubber formulation of the core includes about 0.05 to about 1.5 or about 0.1 to about 1 or about 0.1 to 0.5 parts by weight hardening agent per 100 parts of the total rubber. In another embodiment, the hardening agent is included in the rubber formulation in an amount of about 0.2 to about 0.7 parts by weight per 100 parts of the total rubber. In still another embodiment, the rubber formulation includes about 0.05 to about 0.3 or 0.2 to about 0.4 or about 0.3 to about 0.5 or about 0.4 to about 0.6 parts by weight hardening agent per 100 parts of the total rubber.

In some respects, the amount of hardening agent in the rubber formulation required to produce the desired hardness gradient may differ based on the compound, and even the particular isomer of the compound, used as the hardening agent. For example, when the rubber formulation includes 2-nitrophenol, which has a nitro functional group ortho to a hydroxyl functional group, the hardening agent may be used in an amount of about 0.1 to about 0.3 parts by weight per 100 parts of the total rubber to achieve the desired hardness gradient. In other embodiments, when the rubber formulation includes 3-nitrophenol, which has a nitro functional group meta to a hydroxyl functional group, the hardening agent may be used in an amount of about 0.2 to about 0.4 parts by weight per 100 parts of the total rubber to achieve the desired hardness gradient. In further embodiments, when the rubber formulation includes 4-nitrophenol, which has a nitro functional group para to a hydroxyl functional group, the hardening agent may be used in an amount of about 0.3 to about 0.5 parts by weight hardening agent per 100 parts of the total rubber to achieve the desired hardness gradient. Without being bound by any particular theory, the relative positions of the functional groups on disubstituted benzoic hardening agents are believed to influence the effectiveness of the compound as a hardening agent. Accordingly, the amount of hardening agent needed to produce a desired hardness gradient may change when different isomers within a class of compounds are used.

The rubber formulations further may include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA). An example of a commercially available zinc diacrylate includes Dymalink® 526 manufactured by Cray Valley.

The co-agent may be included in the rubber formulation in varying amounts depending on the desired characteristics of the golf ball core. For example, the co-agent may be used in an amount of about 5 to about 50 or about 10 to about 45 or about 15 to about 40 parts by weight per 100 parts of the total rubber. In one embodiment, the rubber formulation of the core includes about 35 to about 48 parts by weight co-agent per 100 parts of the total rubber. In another embodiment, the rubber formulation includes about 38 to about 45 or about 39 to about 42 parts by weight co-agent per 100 parts of total rubber. In another embodiment, the co-agent is included in the rubber formulation of the core in an amount of about 29 to about 37 or about 31 to about 35 parts by weight per 100 parts of the total rubber. In still another embodiment, the rubber formulation includes about 25 to about 33 or about 27 to about 31 parts by weight co-agent per 100 parts of the total rubber.

In some respects, the amount of co-agent in the rubber formulation may be altered based on the class of compounds, and the particular isomer within a class of compounds, used as the hardening agent. For example, when the rubber formulation includes 2-nitrophenol, the co-agent may be included in the rubber formulation in amount from about 37 to about 43 or about 39 to about 41 parts by weight per 100 parts of the total rubber. In another example, when the rubber formulation includes 3-nitrophenol, the co-agent may be included in the rubber formulation in amount from about 30 to about 36 or about 32 to about 34 parts by weight per 100 parts of the total rubber. In yet another example, when the rubber formulation includes 4-nitrophenol, the co-agent may be included in the rubber formulation in amount from about 26 to about 32 or about 28 to about 30 parts by weight per 100 parts of the total rubber. Without being bound to any particular theory, the concentration of co-agent may be altered to achieve the desired compression of the golf ball core when different hardening agents are used.

The core formulations may include a free radical initiator selected from an organic peroxide, a high energy radiation source capable of generating free radicals, or a combination thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BD-FF, commercially available from Akzo Nobel. In other embodiments, the free radical initiator is dimethyl terbutyl peroxide, including, but not limited to Trigonox® 101-50D-PD, commercially available from Nouryon.

Free radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubber, and an upper limit of 2.5 parts or 3 parts or 5 parts or 6 parts or 10 parts or 15 parts by weight per 100 parts of the total rubber. For example, the rubber formulation may include peroxide free radical initiators in an amount of about 0.1 to about 10 or about 0.5 to about 6 or about 1 to about 5 parts by weight per 100 parts of the total rubber. In another example, the rubber formulation may include peroxide free radical initiators in an amount of about 0.5 to about 2 or about 0.7 to about 1.8 or about 0.8 to about 1.2 or about 1.3 to about 1.7 parts by weight per 100 parts of the total rubber. In yet another example, the rubber formulation may include peroxide free radical initiators in an amount of about 1.5 to about 3 or about 1.7 to about 2.8 or about 1.8 to about 2.2 or about 2.3 to about 2.7 parts by weight per 100 parts of the total rubber.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation. An example of a commercially available radical scavenger includes Rhenogran® Zn-PTCP-72 manufactured by Rheine Chemie. The radical scavenger may be included in the rubber formulation in an amount of about 0.3 to about 1 part by weight per 100 parts of the total rubber. In one embodiment, the rubber formulation may include about 0.4 to about 0.9 parts by weight radical scavenger per 100 parts of the total rubber. In another embodiment, the rubber formulation may include about 0.5 to about 0.8 parts by weight radical scavenger per 100 parts of the total rubber.

The rubber formulation may also include filler(s). Suitable non-limiting examples of fillers include carbon black, clay and nanoclay particles, talc, glass (e.g., glass flake, milled glass, and microglass), mica and mica-based pigments (e.g., Iriodin® pearl luster pigments from The Merck Group), and combinations thereof. Metal oxide and metal sulfate fillers are also contemplated for inclusion in the rubber formulation. Suitable metal fillers include, for example, particulate, powders, flakes, and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof. Suitable metal oxide fillers include, for example, zinc oxide, iron oxide, aluminum oxide, titanium oxide, magnesium oxide, and zirconium oxide. Suitable metal sulfate fillers include, for example, barium sulfate and strontium sulfate. When included, the fillers may be in an amount of about 1 to about 25 parts by weight per 100 parts of the total rubber. In one embodiment, the rubber formulation includes at least one filler in an amount of about 5 to about 20 or about 8 to about 15 parts by weight per 100 parts of the total rubber. In another embodiment, the rubber formulation includes at least one filler in an amount of about 8 to about 14 or about 10 to about 12 parts by weight per 100 parts of the total rubber. In yet another embodiment, the rubber formulation includes at least one filler in an amount of about 10 to about 17 or about 12 to about 15 parts by weight per 100 parts of the total rubber. In yet another embodiment, the rubber formulation includes at least one filler in an amount of about 10 to about 16 or about 12 to about 15 parts by weight per 100 parts of the total rubber. In a further embodiment, the rubber formulation includes at least one filler in an amount of about 12 to about 18 or about 14 to about 16 parts by weight per 100 parts of the total rubber. An example of a commercially available barium sulfate filler includes PolyWate® 325 manufactured by Cimbar Performance Minerals.

In some aspects, the amount of filler in the rubber formulation may be altered based on the compound, and the particular isomer of the compound, used as the hardening agent. For example, when the rubber formulation includes 2-nitrophenol, at least one filler may be included in the rubber formulation in amount from about 9 to about 13 parts by weight per 100 parts of the total rubber. In another example, when the rubber formulation includes 3-nitrophenol, the filler may be included in the rubber formulation in amount from about 11 to about 16 parts by weight per 100 parts of the total rubber. In yet another example, when the rubber formulation includes 4-nitrophenol, the filler may be included in the rubber formulation in amount from about 13 to about 17 parts by weight per 100 parts of the total rubber.

In some embodiments, more than one type of filler may be included in the rubber formulation. For example, the rubber formulation may include a first filler in an amount from about 5 to about 20 or about 8 to about 17 parts by weight per 100 parts total rubber and a second filler in an amount from about 1 to about 10 or about 3 to about 7 parts by weight per 100 parts total rubber. In another example, the rubber formulation may include a first filler in an amount from about 7 to about 13 or about 9 to about 12 parts by weight per 100 parts total rubber and a second filler in an amount from about 2 to about 8 or about 4 to about 6 parts by weight per 100 parts total rubber. In yet another example, the rubber formulation may include a first filler in an amount from about 10 to about 15 or about 13 to about 14 parts by weight per 100 parts total rubber and a second filler in an amount from about 2 to about 9 or about 3 to about 7 parts by weight per 100 parts total rubber. In a further example, the rubber formulation may include a first filler in an amount from about 10 to about 15 or about 13 to about 14 parts by weight per 100 parts total rubber and a second filler in an amount from about 13 to about 18 or about 14 to about 16 parts by weight per 100 parts total rubber.

Antioxidants, processing aids, accelerators (for example, tetra methylthiuram), dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art, may also be added to the rubber formulation. Examples of suitable processing aids include, but are not limited to, high molecular weight organic acids and salts thereof. Suitable organic acids are aliphatic organic acids, aromatic organic acids, saturated mono-functional organic acids, unsaturated mono-functional organic acids, multi-unsaturated mono-functional organic acids, and dimerized derivatives thereof. In one embodiment, the organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof.

The base rubber, hardening agent, cross-linking agent, free radical initiator, fillers, and any other materials used in forming the core 15, in accordance with the present disclosure, may be combined to form a mixture by any type of mixing known to one of ordinary skill in the art. Suitable types of mixing include single pass and multi-pass mixing, and the like. A single pass mixing process where ingredients are added sequentially is preferred, as this type of mixing tends to increase efficiency and reduce costs for the process. In embodiments where a free-radical initiator is used, it may be desirable to combine the hardening agent into the rubber formulation prior to adding the free-radical initiator.

The rubber formulation may be cured using conventional curing processes. Non-limiting examples of curing processes suitable for use in accordance with the present disclosure include peroxide-curing, sulfur-curing, high-energy radiation, and combinations thereof.

The central spherical segment 25 can have a thickness of 2.0 mm-4.0 mm, in one example. The thickness of the central spherical segment 25 can vary depending on the particular requirements or preferences for a specific golfer. In some examples, the thickness of the central spherical segment is greater than 4.0 mm. In some examples, the thickness of the central spherical segment is less than 2.0 mm. In one embodiment, the central spherical segment 25 has a thickness of 1.0 mm-5.0 mm, and more preferably has a thickness of 2.0 mm-3.0 mm.

One of ordinary skill in the art would recognize from the present disclosure that various techniques can be used to form the golf ball core such that the resulting golf ball core has the predetermined specific configuration described herein. Multiple formation techniques are disclosed herein for forming the core of the golf ball.

Figure 2:
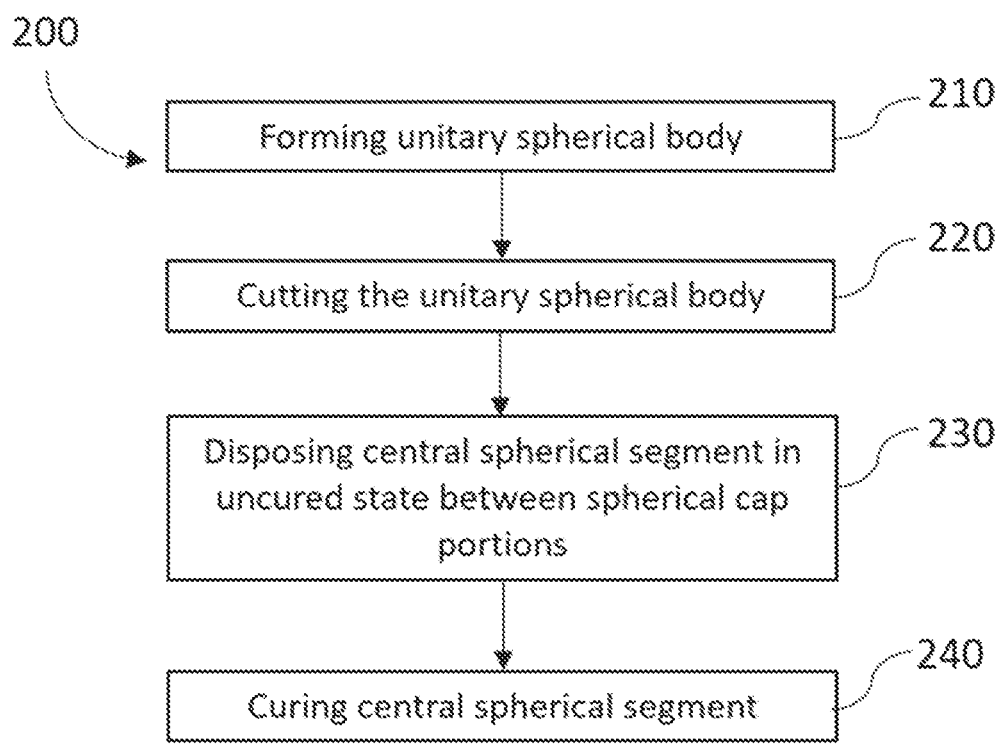
FIG. 2 is a flow diagram illustrating a first method of forming a golf ball core for a golf ball including an alignment aid according to one aspect.

As shown in FIG. 2, a method 200 of forming the core of the golf ball can further comprise initially forming a unitary spherical body (step 210), which can be a fully cured component. Next, the method 200 can comprise cutting the unitary spherical body at a great circle to form the first spherical cap portion and the second spherical cap portion (step 220). These two spherical cap portions can be completely distinct and separate from each other. The shape, size, and other features of the two spherical cap portions can be identical. The method can further comprise disposing the central spherical segment in a pre-cured or uncured state between the first spherical cap portion and the second spherical cap portion (step 230). The method can further comprise curing the central spherical segment to fuse the first spherical cap portion with the second spherical cap portion and form the core (step 240). The two spherical cap portions can be fully cured during step 210, and therefore this subsequent curing step 240 does not further cure the two spherical cap portions or affect the profile or shape of the two spherical cap portions. In one example, the curing process for the central spherical segment can include at least one of applying heat or pressure to the core (i.e., the spherical cap portions plus the central spherical segment). In one example, the two spherical cap portions and the central spherical segment are placed within a mold and subjected to a predetermined temperature for a specific time or cycle. During this curing process, cross-linking can occur, such as between a reactive cross-linking co-agent and rubber (i.e., polybutadiene or other material). Once the core is formed following step 240, the core can then undergo a finishing process, such as centerless grinding or other finishing process. This finishing process can address or account for the core having any out of round characteristics of the core due to the sandwiching of the central spherical segment between the two spherical cap portions, and thereby results in the core being spherical.

In one aspect, the method 200 provides a configuration in which an initial core body is formed that consists of the two spherical cap portions. Cutting the initial core body at the equator results in separate spherical cap portions. Then, uncured rubber, i.e., the central spherical segment, is disposed or sandwiched between the two separate spherical cap portions, resulting in a core assembly. This core assembly is then molded into a solid spherical body via curing of the central spherical segment, which fuses the two separate spherical cap portions with each other. One of ordinary skill in the art would understand that adhesion occurs between the interfacing surfaces of the separate spherical cap portions and the central spherical segment. However, because the separate spherical cap portions were already formed and cured prior to this the step, curing of the central spherical segment does not seep into the separate spherical cap portions.

Figure 3:
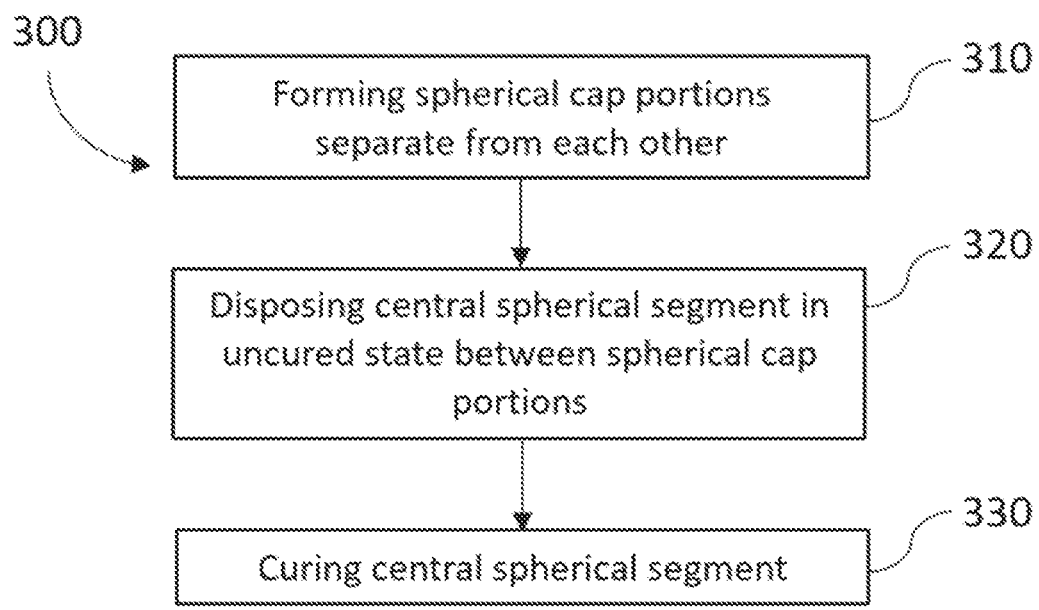
FIG. 3 is a flow diagram illustrating a second method of forming a golf ball core for a golf ball including an alignment aid according to one aspect.

As shown in FIG. 3, another method 300 of forming the core of the golf ball can further comprise forming the first spherical cap portion and the second spherical cap portion separately from each other (step 310), and both as fully cured components. In one example, heat and/or light can be applied to the first spherical cap portion and the second spherical cap portion in this initial step such that curing is not initiated. The method can further comprise disposing the central spherical segment in a pre-cured or uncured state between the first spherical cap portion and the second spherical cap portion (step 320). The term pre-cured as used in this aspect can mean that the rubber of the central spherical segment is not fully cross-linked.

The method can further comprise curing the central spherical segment to fuse the first spherical cap portion with the second spherical cap portion and form the core (step 330). In one aspect, the method 300 provides a configuration in which two spherical cap portions are molded from uncured rubber via half spherical molding cavities. In one aspect, the half spherical molding cavities can be approximately hemispherically shaped. One of ordinary skill in the art would understand that the half spherical molding cavities can be partially hemispherically shaped (i.e., slightly less than a complete hemispherical profile), to account or allow for the central spherical segment to be disposed between the two spherical cap portions. In another example, the half spherical molding cavities can each have a hemispherical profile. As the central spherical segment is fused with the two spherical cap portions, the rubber compresses and is squeezed under pressure such that excess rubber can be displaced out of the mold and into a surrounding excess material retention ring or other compartment. The core can then undergo a finishing process, such as centerless grinding or other process. This finishing process can account for any out of round profile of the core due to the sandwiching of the central spherical segment between the two spherical cap portions, and thereby results in the core being spherical. Regardless of the exact form of the molding cavities, two spherical cap portions that are fully formed and cured can be provided first, and then the uncured rubber which will form the central spherical segment can be sandwiched or disposed between the two spherical cap portions. A subsequent curing process or molding process is carried out to fuse the two spherical cap portions with the central spherical segment, thereby resulting in a solid core.

Figure 4:
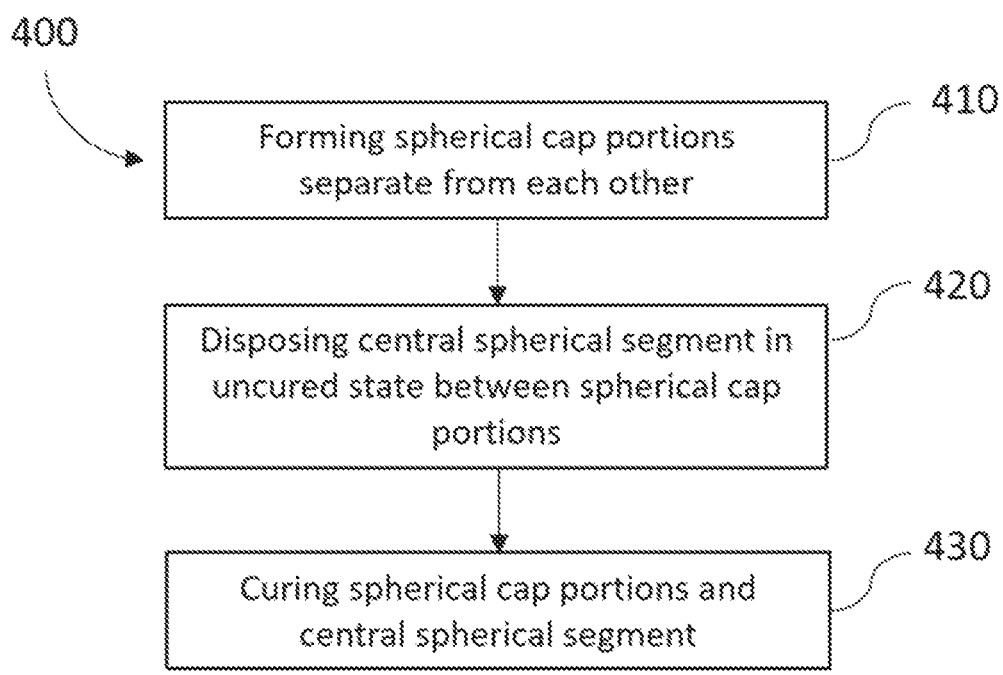
FIG. 4 is a flow diagram illustrating a third method of forming a golf ball core for a golf ball including an alignment aid according to one aspect.

As shown in FIG. 4, another method 400 of forming the core of the golf ball can further comprise forming the first spherical cap portion and the second spherical cap portion separately from each other and in a pre-cured state (step 410). In one aspect, the two spherical cap portions are not fully cured and instead can be thermoformed into shape. The two spherical cap portions can be formed in spherical cap molding cavities, semi-hemispherical molding cavities, or hemispherical molding cavities. In one example, a middle plate can be provided between two molding cavities. In another example, a top plate and a bottom plate can be provided to engage with the top and bottom of the molding cavities. These plates can be heated such that the rubber for forming the spherical cap portions is thermoformed. The method can further comprise disposing the central spherical segment in a pre-cured state between the first spherical cap portion and the second spherical cap portion (step 420). The method can further comprise curing the first spherical cap portion, the second spherical cap portion, and the central spherical segment simultaneously such that the central spherical segment fuses the first spherical cap portion with the second spherical cap portion to form the core (step 430). In one aspect, tooling can be configured to define an overflow channel, area or other portion such that the tooling promotes overflow of material in a region of the central spherical segment. This feature thereby promotes a uniform, flat, and even alignment aid via the central spherical segment.

Figure 5:
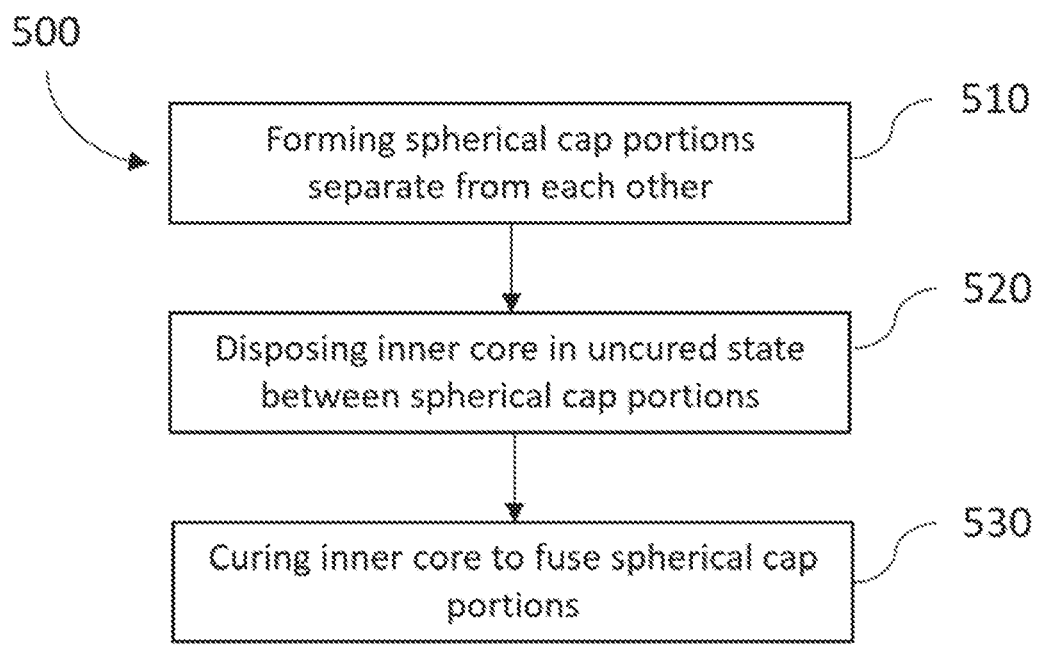
FIG. 5 is a flow diagram illustrating a fourth method of forming a golf ball core for a golf ball including an alignment aid according to one aspect.
Figure 6A:
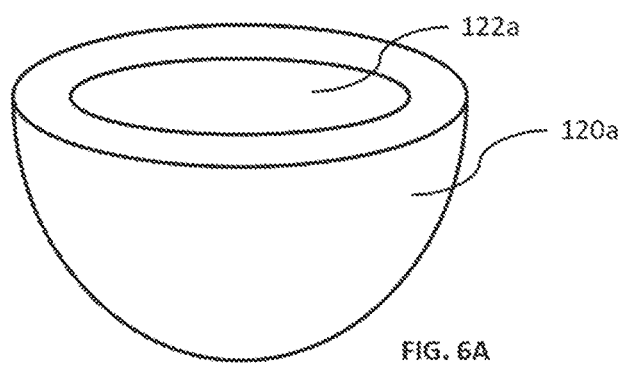
FIG. 6A is a perspective view of a first spherical cap portion according to one aspect.
Figure 6C:
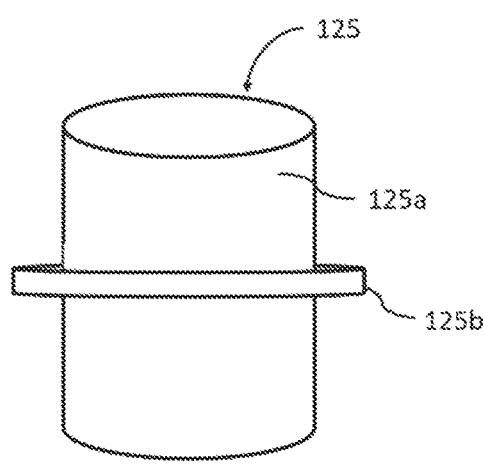
FIG. 6C is a perspective view of an inner core according to one aspect.
Figure 6B:
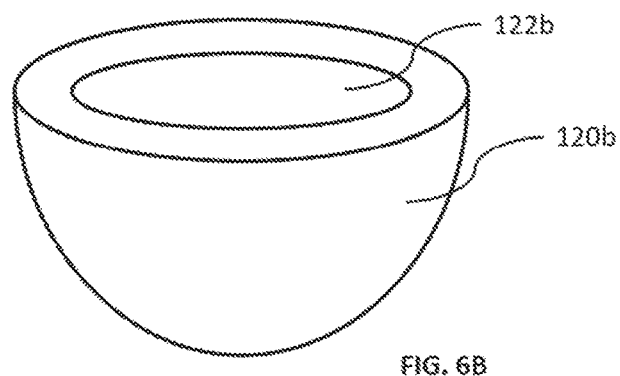
FIG. 6B is a perspective view of a second spherical cap portion according to one aspect.

As shown in FIG. 5, another method 500 of forming the core of the golf ball can further comprise forming the first spherical cap portion 120a and the second spherical cap portion 120b separately from each other (step 510), such that the first spherical cap portion 120a defines a first pocket 122a and the second spherical cap portion 120b defines a second pocket 122b. The first spherical cap portion 120a and the second spherical cap portion 120b can be formed as fully cured components in this step. Spherical cap portion molding cavities or semi-hemispherical molding cavities can be used to form the spherical cap portions 120a, 120b. An additional molding protrusion can be used to provide the indentation or pocket 122a, 122b. For example, hemispherical cavities can be separated by a plate including protrusions. This molding assembly can simultaneously form the spherical cap portions 120a, 120b and the indentation or pockets 122a, 122b. In another example, a plate with protrusions can be heated by a top platen and pressed into hemispherical cavities containing rubber that is heated by a bottom platen to form the spherical cap portions 120a, 120b with pockets or indentations 122a, 122b. The first spherical cap portion 120a including a first pocket 122a is shown in FIG. 6A, and the second spherical cap portion 120b including a second pocket 122b is shown in FIG. 6B. In one aspect, the first spherical cap portion 120a and the second spherical cap portion 120b have shell-like profiles due to the pockets 122a, 122b. The structure of the spherical cap portions can be similar to those used in dual core molding techniques, such as disclosed in US Patent Application Pub. 2022/0062711, U.S. Pat. Nos. 7,361,102, 7,407,378, and 7,335,326, which are commonly assigned to Acushnet Company, and are each incorporated by reference in their entirety as if fully set forth herein. The method 500 further comprises disposing an inner core in a pre-cured or uncured state between the first spherical cap portion and the second spherical cap portion (step 520). The inner core 125 can comprise a first inner core portion 125a having a cylindrical or spherical profile and a second inner core portion 125b that surrounds a periphery of the first inner core portion 125a, which is shown in FIG. 6C. The second inner core portion 125b can be formed as a gasket-like component that is configured to wrap around a periphery of the first inner core portion 125a. The second inner core portion 125b can be configured to engage the surfaces surrounding the pockets 122a, 122b formed on the spherical cap portions 120a, 120b. In one aspect, the second inner core portion 125b can have a different color characteristic than the spherical cap portions 120a, 120b. The second inner core portion 125b can be configured to ultimately define the color of the alignment aid once the golf ball is formed. The first and second inner core portions 125a, 125b can be formed integrally with each other in one example.

The method 500 can further comprise curing the inner core to fuse the first spherical cap portion with the second spherical cap portion thereby forming the core, such that the central spherical segment is at least partially defined by the first inner core portion and the second inner core portion (step 530). One of ordinary skill in the art would understand that the inner core 125 can be formed as a single unitary body and does not require a first and second inner core portion.

In another example, a solid sphere can be injection molded to form the initial golf ball core body. The sphere can be cut at its equator to form two halves (i.e., two spherical cap portions). In another example, the two spherical cap portions can be injection molded as two separate components. In yet another example, two spherical cap portions that are hemispherical or slightly smaller than hemispherical can be injection molded. The central spherical segment can also be injection molded as a separate component or disc-shaped component. The central spherical segment can then be arranged between the two spherical cap portions, and all three components can be joined together as described within this disclosure.

Any one or more of the steps of forming the core of the golf ball can include various molding techniques, such as compression molding, flip molding, injection molding, retractable pin injection molding, reaction injection molding (RIM), liquid injection molding (LIM), casting, vacuum forming, powder coating, flow coating, spin coating, dipping, spraying, and the like. The two spherical cap portions can be placed into molding cavities. Other exemplary formation techniques are disclosed in US Patent Application Pub. 2022/0143470, US Patent Application Pub. 2022/0062711, U.S. Pat. Nos. 7,033,532, 7,407,378, 6,797,097, and 7,335,326, which are commonly assigned to Acushnet Company and are each incorporated by reference in their entirety as if fully set forth herein.

In one aspect, the central spherical segment can be deposited or disposed onto at least one of the inner surfaces of the two spherical cap portions. The molding cavities can then be mated and any suitable molding technique can then be used to fuse the central spherical segment with the two spherical cap portions.

Figure 1B:
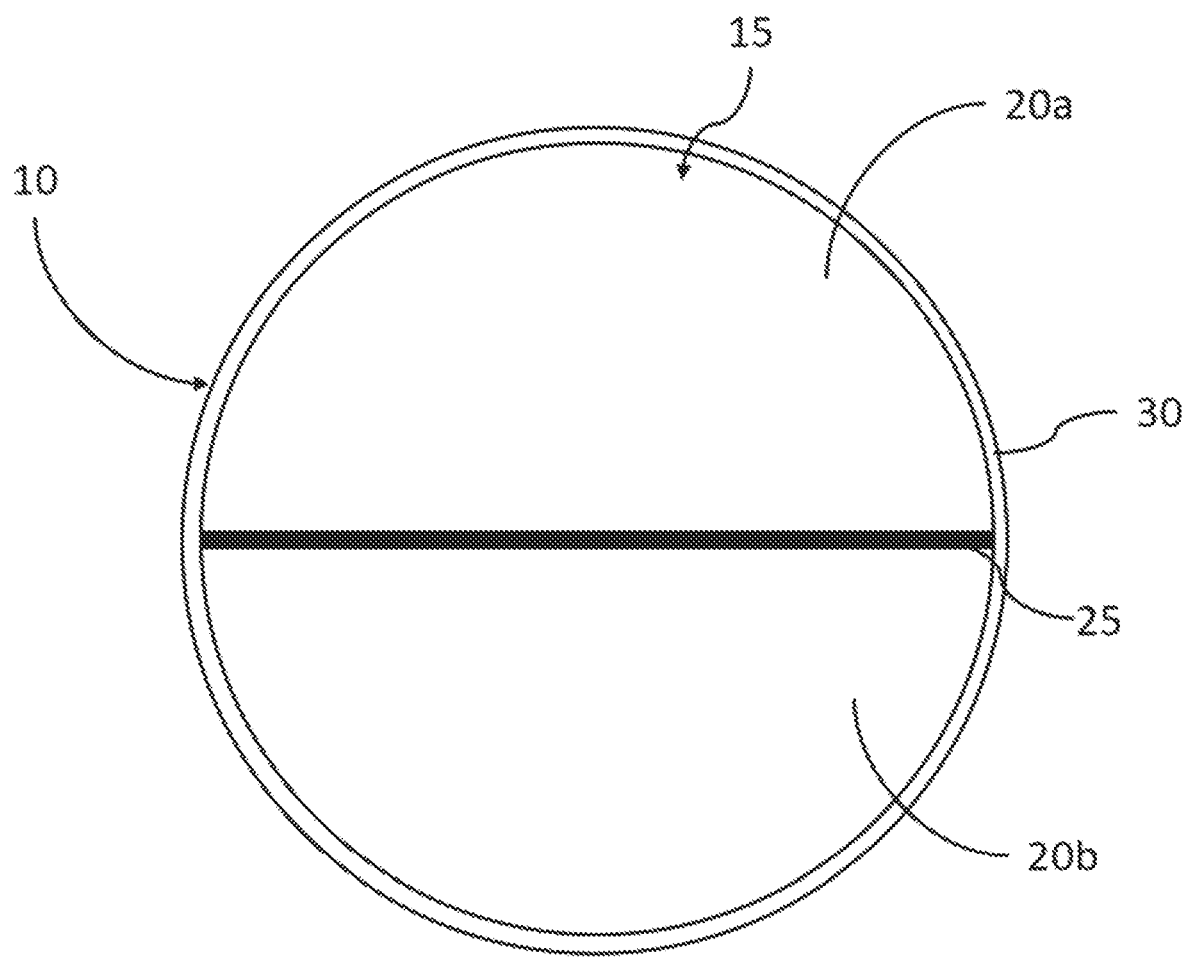
FIG. 1B is another illustration of a golf ball including an alignment aid according to one aspect.

In another aspect, a golf ball 10 is disclosed herein, as shown in FIGS. 1A and 1B. FIG. 1A illustrates cross-hatching for the golf ball 10, while FIG. 1B illustrates exemplary color patterns (i.e., white for spherical cap portions, black for central spherical segment, clear for color) for the golf ball 10. The golf ball 10 can comprise a core 15 having a first spherical cap portion 20a, a second spherical cap portion 20b, and a central spherical segment 25 arranged between the first spherical cap portion 20a and the second spherical cap portion 20b. The central spherical segment 25 can have a first color characteristic, and at least one of the first spherical cap portion 20a or the second spherical cap portion 20b can have a second color characteristic that is different than the first color characteristic. A cover 30 can be configured to fully encase the core 15. The cover 30 can be transparent or semi-transparent such that the orientation of the central spherical segment 25 is visible from an exterior of the golf ball 10. The central spherical segment 25 therefore serves as an alignment aid for a golfer. The first spherical cap portion 20a and the second spherical cap portion 20b can each have the second color characteristic. In one example, the central spherical segment 25 can be black and the first spherical cap portion 20a and the second spherical cap portion 20b can be white. The first color characteristic of the central spherical segment 25 can define a continuous strip across a great circle of the golf ball 10.

Although a single cover layer is shown in FIGS. 1A and 1B, one of ordinary skill in the art would appreciate based on the present disclosure that the cover layer can be comprised of more than one layer. For example, the cover layer can be formed from polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer; cross-linked trans-polyisoprene and blends thereof; polyester-based thermoplastic elastomers; polyurethane-based thermoplastic elastomers; synthetic or natural vulcanized rubber; and combinations thereof.

The first spherical cap portion 20a and the second spherical cap portion 20b can be formed from a first material, and the central spherical segment 25 can be formed from a second material that is different than the first material.

In one example, the first spherical cap portion 20a and the second spherical cap portion 20b can be formed from a first synthetic rubber blend, and the central spherical segment 25 can be formed from a second synthetic rubber blend. Specific characteristics of the rubber blends can be selected to provide varying various performance characteristics for the golf ball, such as increasing or decreasing spin.

Another method of forming a golf ball 10 is also disclosed herein. The method can comprise forming a core 15 comprising: a first spherical cap portion 20a, a second spherical cap portion 20b, and a central spherical segment 25 formed at a great circle of the core 15 and arranged between the first spherical cap portion 20a and the second spherical cap portion 20b. The central spherical segment 25 can have a first color, and the first spherical cap portion 20a and the second spherical cap portion 20b can each have a second color that is different than the first color. The central spherical segment 25 can have a thickness of 2.0 mm-4.0 mm and can define a continuous strip across a great circle of the golf ball 10. The method can further comprise encasing the core 15 in a cover 30 to form the golf ball 10. The cover 30 can be clear such that the orientation of the central spherical segment 25 is visible from an exterior of the golf ball 10.

One of ordinary skill in the art would understand that multiple colors can be used for any one or more of the components of the core. For example, the central spherical segment 25 can be formed from materials having multiple colors. In another example, three different colors can be used for the first spherical cap portion 20a, the second spherical cap portion 20b, and the central spherical segment 25. Pigments or dyes can be used to color any one or more of the first spherical cap portion 20a, the second spherical cap portion 20b, and the central spherical segment 25. The pigments or dyes can be selected for the first spherical cap portion 20a, the second spherical cap portion 20b, and the central spherical segment 25 such that the pigments or dyes have a high contrasting color relationship from each other.

As used in this disclosure, in one aspect, the term cured means a fully hardened or formed state, and/or a state in which the rubber is fully cross-linked. In one aspect, the term cured means that the rubber or rubber mixture or composition is at least 60% cross-linked. In another aspect, the term cured means that the rubber or rubber mixture or composition is at least 75% cross-linked. In another aspect, the term cured means that the rubber or rubber mixture or composition is at least 90% cross-linked. According to one aspect, the term pre-cured or uncured can mean a state in which the rubber or rubber mixture or composition is not fully hardened or formed. In one aspect, the term pre-cured or uncured can mean that the rubber or rubber mixture or composition is less than 60% cross-linked. In another aspect, the term pre-cured or uncured can mean that the rubber or rubber mixture or composition is less than 75% cross-linked.

In another aspect, the term pre-cured or uncured can mean that the rubber or rubber mixture or composition is less than 90% cross-linked.

Based on the constructions and methods of forming a golf ball as disclosed herein, various properties for the golf ball can be obtained or realized. Exemplary characteristics or properties of the golf ball or golf ball core are described in more detail below.

Coefficient of Restitution

The golf ball cores and golf balls of the present disclosure can be tailored to have a desired or targeted coefficient of restitution (COR) value. In one example, the COR of the golf ball cores formed according to the present disclosure at 125 ft/s is about 0.740 or greater. In another example, the COR of the golf ball core according to the present disclosure at 125 ft/s is about 0.860 or less. In another example, the COR can be between 0.700 to 0.810. In another example, the COR can be between 0.750 to 0.780. In yet another example, the COR can be between 0.680 to 0.850.

Compression

Several different methods can be used to measure compression, including Atti compression, Riehle compression, load/deflection measurements at a variety of fixed loads and offsets, and effective modulus (see, e.g., Compression by Any Other Name, Science and Golf IV, Proceedings of the World Scientific Congress of Golf (Eric Thain ed., Routledge, 2002) (J. Dalton)). For purposes of the present disclosure, compression values are provided as measured by the Dynamic Compression Machine ("DCM") as well as the Soft Center Deflection Index ("SCDI"). The DCM applies a load to a ball component or a ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

The SCDI is a slight variation of the DCM set up that allows determination of the pounds required to deflect a component or ball 10 percent of its diameter. With the SCDI, the goal is to obtain the pounds of force required to deflect a component or ball a certain number of inches. That amount of deflection is 10 percent of the component or ball diameter. The DCM is triggered, the cylinder deflects the component or ball by 10 percent of its diameter, and the DCM reports back the pounds of force required (as measured from the attached load cell) to deflect the component or ball by that amount. The SCDI value obtained is a single number in units of pounds.

In one example, the compression of a golf ball according to the present disclosure can be 40-110 DCM. In another example, the compression of the golf ball is at least 50 DCM and no greater than 120 DCM.

Hardness

The hardness of the geometric center of the core may be obtained according to the following: the core is first gently pressed into a hemispherical holder having an internal diameter approximately slightly smaller than the diameter of the core, such that the core is held in place in the hemispherical portion of the holder while concurrently leaving the geometric central plane of the center exposed. The core is secured in the holder by friction, such that it will not move during the cutting and grinding steps, but the friction is not so excessive that distortion of the natural shape of the core would result. The core is secured such that the parting line of the center is roughly parallel to the top of the holder. The diameter of the center is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed "rough" surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the geometric center of the core is confirmed with a center square and carefully marked, and the hardness is measured at the center mark according to ASTM D-2240.

Additional hardness measurements at any distance from the geometric center of the core can then be made by drawing a line radially outward from the geometric center mark and measuring the hardness at any given distance along the line, typically in 2.0 mm increments from the center of the core. The hardness at a particular distance from the geometric center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of the core (or any golf ball layer) is measured on the actual outer surface of the layer and is obtained from the average of a number of measurements taken from opposing hemispheres, taking care to avoid making measurements on the parting line of the core or on surface defects, such as holes or protrusions and preferably making the measurements prior to surrounding the layer of interest with an additional layer. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240. Once an additional layer surrounds a layer of interest, the hardness of the layer of interest can be difficult to determine. Therefore, for purposes of the present disclosure, when the hardness of a layer is needed after the inner layer has been surrounded with another layer, the test procedure for measuring a point located 1.0 mm from an interface is used.

It should also be noted that there is a fundamental difference between "material hardness" and "hardness as measured directly on a golf ball" (or, as used herein, "surface hardness"). For purposes of the present disclosure, material hardness is measured according to ASTM D-2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of layers, and the like); ball (or ball sub-assembly) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

In one example, the surface hardness can be 60 Shore C to 100 Shore C. In another example, the surface hardness can be 45 Shore C to 90 Shore C. In yet another example, the surface hardness can be 55 Shore C to 95 Shore C.

A golf ball and method of forming a golf ball is disclosed herein in which the core body of the golf ball includes an alignment aid that is configured to be visible after the core body is enclosed within a cover. The alignment aid can be an integral component of the core body, and also serve a functional purpose in that the alignment aid is formed via a segment that fuses two cap portions of the core body with one another. The alignment aid thereby provides a manufacturing efficiency by performing a purpose during assembly, and also further provides a useful function for the consumer via the alignment aid. Additionally, the alignment aid provides an additional portion for the core body which can be adjusted or modified to alter the performance characteristics of the golf ball by selecting different rubber compositions for the central spherical segment as compared to the spherical cap portions.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A method of forming a golf ball with an alignment aid, the method comprising:
   (i) forming a core comprising a first spherical cap portion, a second spherical cap portion, and a central spherical segment formed at a great circle of the core and arranged between the first spherical cap portion and the second spherical cap portion,
      wherein the central spherical segment has a first color characteristic, and at least one of the first spherical cap portion or the second spherical cap portion has a second color characteristic that is different than the first color characteristic; and
   (ii) encasing the core in a cover to form the golf ball,
      wherein the cover is at least partially transparent, and the central spherical segment is visible from an exterior of the golf ball such that the central spherical segment defines an alignment aid for the golf ball,
      wherein the first spherical cap portion and the second spherical cap portion are formed from a first material composition, and the central spherical segment is formed from a second material composition that is different than the first material composition.

2. The method according to claim 1, wherein the first spherical cap portion and the second spherical cap portion each have the second color characteristic.

3. The method according to claim 1, wherein the first color characteristic of the central spherical segment defines a continuous strip across a great circle of the golf ball.

4. The method according to claim 1, wherein the central spherical segment has a thickness of 2.0 mm-4.0 mm.

5. The method according to claim 1, wherein the central spherical segment defines a barrier between the first spherical cap portion and the second spherical cap portion.

6. The method according to claim 1, wherein step (i) comprises forming the core via:
forming a unitary spherical body as a cured component;
cutting the unitary spherical body at a great circle to form the first spherical cap portion and the second spherical cap portion;
disposing the central spherical segment in an uncured state between the first spherical cap portion and the second spherical cap portion; and
curing the central spherical segment to fuse the first spherical cap portion with the second spherical cap portion and form the core.

7. The method according to claim 1, wherein step (i) comprises forming the core via:
forming the first spherical cap portion and the second spherical cap portion separately from each other and as cured components;
disposing the central spherical segment in an uncured state between the first spherical cap portion and the second spherical cap portion; and
curing the central spherical segment to fuse the first spherical cap portion with the second spherical cap portion and form the core.

8. The method according to claim 1, wherein step (i) comprises forming the core via:
forming the first spherical cap portion and the second spherical cap portion separately from each other and in an uncured state;
disposing the central spherical segment in an uncured state between the first spherical cap portion and the second spherical cap portion; and
curing the first spherical cap portion, the second spherical cap portion, and the central spherical segment simultaneously such that the central spherical segment fuses the first spherical cap portion with the second spherical cap portion to form the core.

9. A method of forming a golf ball with an alignment aid, the method comprising:
(i) forming a core comprising a first spherical cap portion, a second spherical cap portion, and a central spherical segment formed at a great circle of the core and arranged between the first spherical cap portion and the second spherical cap portion,
wherein the central spherical segment has a first color characteristic, and at least one of the first spherical cap portion or the second spherical cap portion has a second color characteristic that is different than the first color characteristic; and
(ii) encasing the core in a cover to form the golf ball, wherein the cover is at least partially transparent, and the central spherical segment is visible from an exterior of the golf ball such that the central spherical segment defines an alignment aid for the golf ball,
wherein the central spherical segment is formed from a first rubber composition having a first coefficient of restitution, and the first spherical cap portion and the second spherical cap portion are formed from a second rubber composition having a second coefficient of restitution that is less than the first coefficient of restitution.

10. A method of forming a golf ball with an alignment aid, the method comprising:
(i) forming a core comprising a first spherical cap portion, a second spherical cap portion, and a central spherical segment formed at a great circle of the core and arranged between the first spherical cap portion and the second spherical cap portion,
wherein the central spherical segment has a first color characteristic, and at least one of the first spherical cap portion or the second spherical cap portion has a second color characteristic that is different than the first color characteristic; and
(ii) encasing the core in a cover to form the golf ball, wherein the cover is at least partially transparent, and the central spherical segment is visible from an exterior of the golf ball such that the central spherical segment defines an alignment aid for the golf ball,
wherein step (i) comprises forming the core via:
forming the first spherical cap portion and the second spherical cap portion separately from each other and as cured components, wherein the first spherical cap portion defines a first pocket and the second spherical cap portion defines a second pocket;
disposing an inner core in an uncured state between the first spherical cap portion and the second spherical cap portion, wherein the inner core comprises a first inner core portion having a cylindrical or spherical profile and a second inner core portion that surrounds a periphery of the first inner core portion; and
curing the inner core to fuse the first spherical cap portion with the second spherical cap portion and form the core, such that the central spherical segment is at least partially defined by the first inner core portion and the second inner core portion.

11. A method of forming a golf ball with an alignment aid, the method comprising:
(i) forming a core comprising:
a first spherical cap portion, a second spherical cap portion, and a central spherical segment formed at a great circle of the core and arranged between the first spherical cap portion and the second spherical cap portion,
wherein the central spherical segment is a first color, and the first spherical cap portion and the second spherical cap portion each are a second color that is different than the first color, wherein the central spherical segment defines a continuous strip across a great circle of the golf ball; and
(ii) encasing the core in a cover to form the golf ball, wherein the cover is clear such that the central spherical segment is visible from an exterior of the golf ball and defines an alignment aid on the golf ball,
wherein the central spherical segment is formed from a first rubber composition having a first coefficient of restitution, and the first spherical cap portion and the second spherical cap portion are formed from a second rubber composition having a second coefficient of restitution that is different than the first coefficient of restitution.

* * * * *